United States Patent [19]

Takida et al.

[11] 4,058,904
[45] Nov. 22, 1977

[54] PROCESS FOR DRYING WET PARTICLES OF HYDROLYZED ETHYLENE-VINYL ACETATE COPOLYMER

[75] Inventors: Hiroshi Takida, Takatsuki; Akio Kido, Ogaki; Masazumi Takahashi, Itami, all of Japan

[73] Assignee: Nippon Gohsei Kagaku Kogyo Kabushiki Kaisha, Osaka, Japan

[21] Appl. No.: 669,964

[22] Filed: Mar. 24, 1976

[30] Foreign Application Priority Data

Apr. 1, 1975 Japan .................................. 50-40020

[51] Int. Cl.² ............................................. F26B 7/00
[52] U.S. Cl. ............................................. 34/12; 34/15
[58] Field of Search ................................... 34/12, 15

[56] References Cited
U.S. PATENT DOCUMENTS 3,802,090  4/1974  Delhaye et al. ........................ 34/15

*Primary Examiner*—John J. Camby
*Attorney, Agent, or Firm*—Armstrong, Nikaido & Marmelstein

[57] ABSTRACT

Process for drying wet particles of hydrolyzed ethylene-vinyl acetate copolymer under the spcific condition as follows:
  a. a pressure in a dryer of not more than 120 mmHg,
  b. a temperature of the heating surface of dryer of not more than 100° C., and
  c. $T \times \theta^{0.6} \leq 320$, wherein T is a temperature (° C.) of the heating surface of dryer and $\theta$ is a residence time (hour) of the particles in the dryer. The thus obtained particles have excellent molding properties.

1 Claim, 3 Drawing Figures

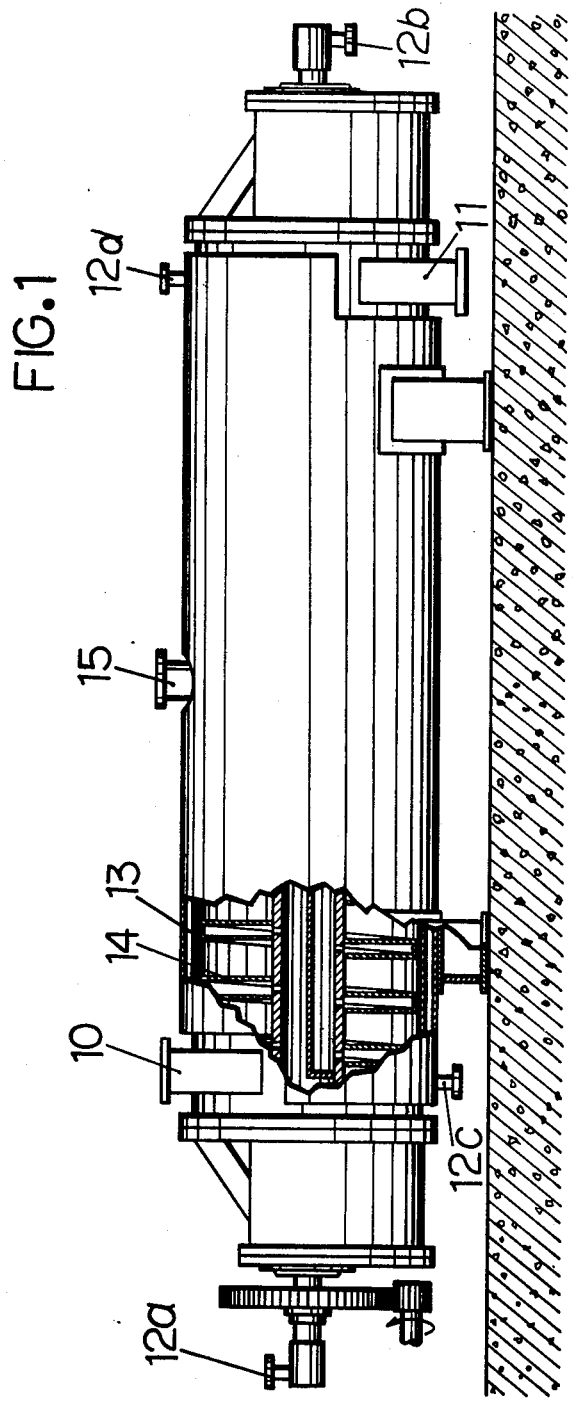

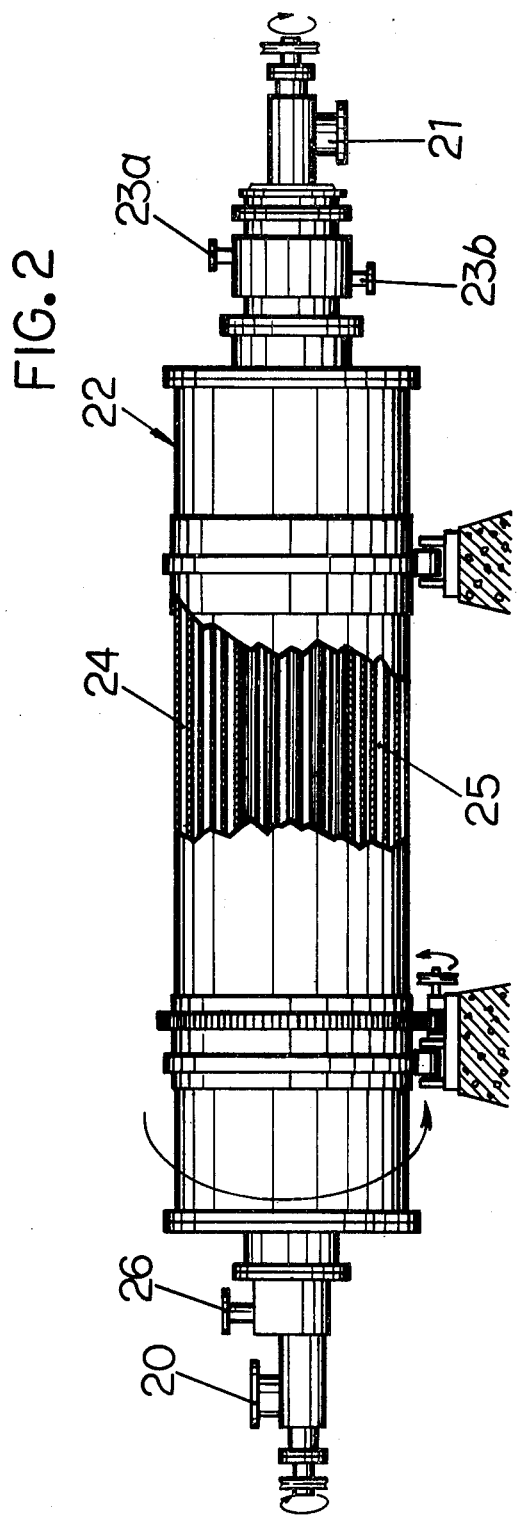

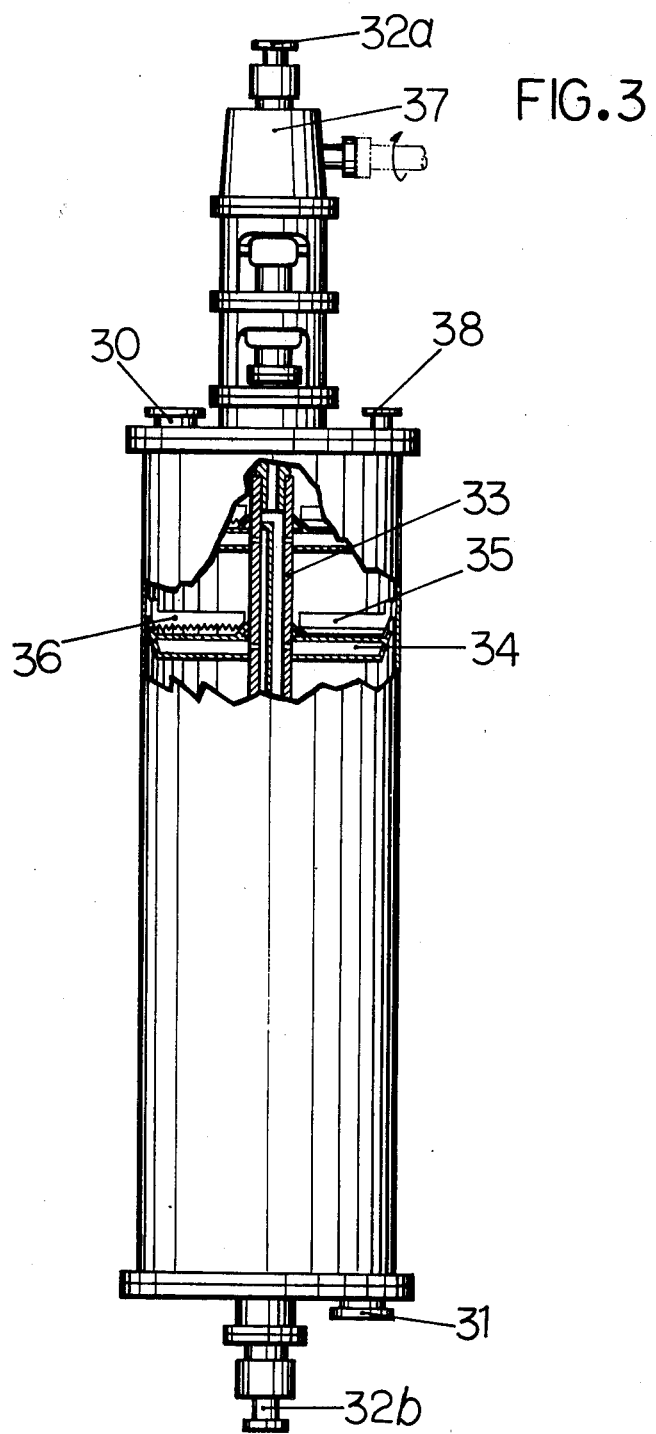

PROCESS FOR DRYING WET PARTICLES OF HYDROLYZED ETHYLENE-VINYL ACETATE COPOLYMER

BACKGROUND OF THE INVENTION

The present invention relates to a process for drying particles of hydrolyzed ethylene-vinyl acetate copolymer, more particularly to the process which provides the particles having excellent molding properties.

Hydrolyzed ethylene-vinyl acetate copolymer, having ethylene content of 20 to 50 % by mole, vinyl acetate content (including hydrolyzed portion thereof) of 80 to 50% by mole and degree of hydrolysis in vinyl acetate component of not less than 90% by mole, is suitably employed for the use of wrapping films or vessels for foods, because the oxygen permeability of the hydrolyzed copolymer is remarkably low as compared with other known snythetic resins. The hydrolyzed copolymer is also suitable for use as the so-called engineering plastics, such as machine parts, electric-device parts and vessels, because the antistatic property, resistances against oils and solvents, and mechanical strength are excellent.

The hydrolyzed ethylene-vinyl acetate copolymer has been prepared by hydrolyzing an ethylene-vinyl acetate copolymer in a medium in the presence of an alkaline catalyst, separating particles from the reaction mixture and drying the wet particles in air. If necessary, before drying, the wet particles are washed with water or an organic solvent to remove completely the catalyst and by-produced salts from the particles, and are subjected to an appropriate stabilization treatment. However, films or vessels melt-molded of the thus prepared copolymer have a number of fish eyes of 0.1 to 1 mm. in diameter. Also, in the case of continuing the molding for a long period of time, the melt viscosity of the hydrolyzed copolymer increases with the lapse of time. Therefore, it is very difficult to smoothly prepare a molded article having good appearance and properties by employing the hydrolyzed copolymer so prepared. Further, when machine parts and electric-device parts are prepared by means of injection molding, useless portions such as sprue and runner account for a good amount. The reuse of such useless portions has an effect on reducing the price of molded article, but the reuse of the hydrolyzed copolymer causes the lowering of, not only the molding property and the appearance, for example fish eye, coloration, of the obtained molded article but also sometimes the lowering of physical properties.

The fish eye is small swelling on film surface like eye of fish, and this decreases oxygen impermeability and impairs appearance of film. Great many factors of the generation of the fish eye can be considered in each step of polymerization, hydrolysis, drying and molding of the copolymer, and many attempts to solve the problem have been made. There has been, for example, proposed in Japanese Pat. publication No. 37665/1971 a process for drying particles of hydrolyzed ethylene-vinyl acetate copolymer in an atmosphere of inert gas such as nitrogen, carbon dioxide gas or mixture thereof, which contains not more than 5 % by volume of oxygen, at a temperature of not more than 95° C. with agitation. This process has the advantage that the generation of fish eyes can be reduced in the molding of relatively short period of time. However, when molding is continued for a long period of time, fish eyes and the melt viscosity of the hydrolyzed copolymer increases with the lapse of time. Also, the reuse of such a hydrolyzed copolymer causes the viscosity increase and the coloration.

OBJECTS OF THE INVENTION

It is an object of the present invention to provide an improved process for drying particles of hydrolyzed ethylene-vinyl acetate copolymer.

A further object of the invention is to provide particles of hydrolyzed ethylene-vinyl acetate copolymer suitable for raw materials of film and other molded articles having no fish eye, no coloration, good appearance and physical properties, no molding continuously for a long period of time.

These and other objects of the invention will become apparent from the description hereinafter.

BRIEF DESCRIPTION OF THE DRAWINGS

FIG. 1 is a partially cutaway view in elevational of a horizontal, cylindrical vacuum drying apparatus of agitation type which may be employed in carrying out the present invention, FIG. 2 is a partially cutaway view in elevational of a horizontal, cylindrical vacuum drying apparatus of rotation type which may be employed in carrying out the present invention, and FIG. 3 is a partially cutaway view in elevational of a vertical, cylindrical vacuum drying apparatus which may be employed in carrying out the present invention.

DETAILED DESCRIPTION

It has now been found that the above-mentioned objects can be accomplished by drying wet particles of hydrolyzed ethylene-vinyl acetate copolymer under the specific conditions.

According to the present invention, the drying is carried out under a reduced pressure of not more than 120 mmHg and at a temperature of heating surface of a dryer of not more than 100° C. Also, it is necessary for the present invention to select the above temperature and a residence time of the particles in the dryer from the range satisfying the following equation:

$$T \times \theta^{0.6} \leqq 320$$

wherein T is a temperature (°C.) of heating surface of the dryer and $\theta$ is a residence time (hour) of the particles in the dryer.

When the drying is carried out under such specific conditions, the particles have excellent molding properties. For instance, the number of fish eyes on the film from the particle according to the invention is reduced to about 1/10 to about 1/100 time that of the film obtained from the particle conventionally prepared. This effect is maintained even if molding is continuously carried out for a long period of time. Also, even if the molding is continuously carried out for a long period of time, the melt viscosity scarcely increases. It is industrially advantageous since there is no necessity of changing initial molding conditions. Further, reuse of the hydrolyzed polymer can be made without viscosity increase and coloration.

It is essential for the present invention to select the pressure and temperature in a dryer and the residence time of the particles of hydrolyzed copolymer from the specific ranges as mentioned above. So far as the drying is carried out under such conditions, there is no necessity of replacing an atmosphere in a dryer with an inert gas. For instance, even in an atmosphere of oxygen the drying according to the invention can be carried out without any trouble.

In the present invention, wet particles of the hydrolyzed ethylene-vinyl acetate copolymer having an ethylene content of 20 to 50 % by mole, a vinyl acetate content of 80 to 50 % by mole and a degree of hydrolysis in vinyl acetate component of not less than 90% by mole are subjected to drying. Hydrolyzed ethylene-vinyl acetate copolymers having a composition outside the above range are not suitable since physical properties of a molded article of such copolymers are inferior. The hydrolyzed copolymer may contain another copolymerizable monomers such as olefins, e.g. propylene and isobutylene, unsaturated acids, e.g. acrylic acid, methacrylic acid, crotonic acid and maleic acid, and esters of the unsaturated acids.

In general, the hydrolyzed ethylene-vinyl acetate copolymer is prepared by hydrolyzing ethylene-vinyl acetate copolymer in a medium such as low aliphatic alcohol, water or mixture thereof, in the presence of an alkaline catalyst. The thus obtained particles of the hydrolyzed copolymer are separated from the reaction mixture. As occasion demands, the particles are washed with water, an organic solvent such as low aliphatic alcohol, or mixture thereof, to remove catalyst and by-produced salts remaining in the particles and the washed particles are then subjected to a stabilization treatment by dipping the particles into an aqueous solution of organic solution of an acid such as acetic acid or phosphoric acid. Usually, more than 80 % of the wet particles so prepared has a particle size of about 10 to about 300 meshes. The wet particles usually contain about 35 to about 55 % by weight of volatile material and such wet particles are subjected to the drying according to the present invention. Of course, the wet particles of which volatile material content is reduced to less than 35 % by weight by high degree of centrifugation or pre-drying may be subjected to the drying.

In the present invention, the pressure in a dryer must be not less than 120 mmHg. When the pressure is more than 120 mmHg, long run molding property is poor and many fish eyes appear upon molding. Also, the temperature T of heating surface of a dryer must be not more than 100° C. When the temperature is more than 100° C., long run molding property is poor and generation of fish eyes is not inhibited. Further, the value of $T \times \theta^{0.6}$ wherein T is a temperature (°C.) of heating surface of a dryer and $\theta$ is a residence time (hour) of the particles in a dryer must be not more than 320. When the value is more than 320, long run molding property, reusing ability and inhibition of generation of fish eyes are insufficient.

In the present invention, any of vacuum dryer or vacuum drying apparatuses may be employed. For instance, the most general vacuum drying apparatus is that made up of a cylinder having a double jacket and an agitator having a blade of scrape-up type. The particles to be dryed are charged into the cylinder and dried with agitation. In the drying apparatus of this type, heat is conducted from the jacket.

Although the objects of the invention can be attained by employing such a vacuum drying apparatus, employment of a vacuum drying apparatus which substantially give no shearing force to the particles between an agitating blade and walls of the drying apparatus exhibits more excellent effect. As such a vacuum drying apparatus, for instance, a horizontal, cylindrical vacuum drying apparatus of agitation type as shown in FIG. 1, a horizontal cylindrical vacuum drying apparatus of rotation type as shown in FIG. 2, and a vertical, cylindrical vacuum drying apparatus as shown in FIG. 3 are suitable. In FIG. 1, the wet particles are supplied from an inlet 10 and the dried particles are discharged from an outlet 11. Reference numerals 12a, 12b, 12c and 12d shown an entrance and exit for heating medium, and reference numeral 13 shows a jacket. The wet particles are agitated by means of a discoid or discontinuous spiral blade 14 which is located at a right angle to the axis. Reference numeral 15 shows a suction opening for gas. In FIG. 2, the wet particles are supplied from an inlet 20 and the dried particles are discharged from an outlet 21. The wet particles are agitated by rotating a cylinder 22. Reference numerals 23a and 23b shown an entrance and exit for heating medium, and reference numeral 24 shows a jacket. Reference numeral 25 shows a heating tube. Reference numeral 26 shows a suction opening for gas. In FIG. 3, the wet particles are supplied from an inlet 30 and the dried particles are discharged from an outlet 31. Reference numerals 32a and 32b show an entrance and exit for heating medium. An axis 33 is equipped with a disk 34 which is located at a right angle to the axis, and the heating medium is passed through the axis 33 and the disk 34. The wet particles on the disk at the upper step are transferred to the disk at the lower step by scraping away the particles from the disk by means of a scrapper 35. Reference numeral 36 shows a leveler. Referene numeral 37 shows a bevel gear and reference numeral 38 shows a suction opening for gas. When a large-sized apparatus is employed, the apparatus having large heating area per volume of the particles, as shown in FIG. 2 or FIG. 3, is suitable for attaining the objects of the invention because the heating effect is very good, the condition of $T \times \theta^{0.6} \leq 320$ is readily satisfied and no shear falls on the particles.

In the invention, any of batchwise and continuous type vacuum drying apparatuses may be employed.

The particles of hydrolyzed copolymer obtained according to the invention can be molded by any of the known molding methods such as injection molding, extrusion, compression molding, casting, vacuum molding and rotational molding. It is also possible to prepare a laminated or coated material by laminating or coating the melted hydrolyzed copolymer to another film or a base material. Upon molding, to the hydrolyzed ethylene-vinyl acetate copolymer a known additive such as stabilizer, plasticizer, filler, coloring material or blowing agent, or a reinforcement material such as glass fiber or carbon fiber, or another modifying resin may be added.

The present invention is more specifically described and explained by means of the following Examples, in which all percents are percent by weight unless otherwise specified.

EXAMPLES 1 and 2 AND CONTROLS 1 to 5

A 200 liter horizontal dryer equipped with agitating blade of scrape-up type was charged with 60 kg. of wet particles (10 mesh sieve pass) of hydrolyzed ethylene-vinyl acetate copolymer (ethylene content: 28.5% by mole, degree of hydrolysis in vinyl acetate component: 98.5 % by mole) containing 45% of water, and drying was carried out under drying conditions shown in the following Table 1.

As Controls, drying at atmospheric pressure in air (Control 1), drying under reduced pressure outside the specific ranges of the invention (Controls 2, 3 and 4) and drying at atmospheric pressure of nitrogen were also carried out. These drying conditions are also shown in the following Table 1.

Melt flow index was measured at a temperature of 210° C. and a total load of 2160 g. according to ASTM D 1238-65T(B).

The melt flow index after 24 hours was measured on

Table 1

|  | Pressure in dryer [P] mmHg | Temperature of heating surface of dryer [T] (temperature of heating medium) ° C. | [θ] Residence time [θ] (drying time) hour | $T \times \theta^{0.6}$ — | Content of volatile material after drying % |
|---|---|---|---|---|---|
| Example 1 | 110 | 96 | 4.2 | 227 | 2.0 |
| Example 2 | 60 | 91 | 4.1 | 212 | 1.9 |
| Control 1 | 760 | 118 | 8.5 | — | 2.0 |
| Control 2 | 100 | 94 | 10.3 | 381 | 1.9 |
| Control 3 | 300 | 98 | 5.8 | 281 | 2.1 |
| Control 4 | 80 | 110 | 3.5 | 234 | 2.0 |
| Control 5 | 760 | 102 | 14.5 | — | 2.2 |

The dry powder so obtained was supplied to an extruder of vent type and was melt-extruded in a line. The extrudate was cut into pieces to prepare pellets. The water content of the pellet was 0.2 to 0.4 %.

A film having a thickness of 20 μ was continuously prepared from the thus obtained pellets for 24 hours under the following conditions.

MOLDING CONDITIONS:

Extruder: Extruder of 40 mm. in diameter
Cylinder temperature: $C_1$; 190° C., $C_2$; 205° C., $C_3$; 210° C., $C_4$; 220° C., $C_5$; 230° C.
Temperature of T-die: 205° C.
Effective width of T-die: 300 mm.
Screen: 50/100/250/100 meshes
Screw: dulmadge type L/D = 28
Revolution number of screw: 30 r.p.m.
The results are shown in Table 2.

the basis of the residual resin at the corner of manifold at the end of molding.

As is clear from Table 2, in the present invention, long run molding property is very good and increases of fish eyes after the lapse of long time is also very small.

The pellet was supplied to an injection molding machine and a spiral article, cross section of which was half circle having a diameter of 6 mm., was prepared under the following injection molding conditions.

INJECTION MOLDING CONDITION:

Injection molding machine: In-line screw type injection molding machine of 3.5 oz.avdp.
Cylinder temperature at front part: 230° C.
Cylinder temperature at rear part: 210° C.
Nozzle temperature: 225° C.
Mold temperature: 70° C.
Injection pressure: 1,300 kg./cm².

Table 2

|  | Melt flow index (g./10 minutes) | | Appearance of film | | | |
|---|---|---|---|---|---|---|
|  | supplied resin | after 24 hours | Immediately after operation | | after 24 hours | |
| Example 1 | 4.3 | 3.4 | FE(L) | 0 | FE(L) | 0 |
|  |  |  | FE(S) | 20 | FE(S) | 25 |
| Example 2 | 4.3 | 3.3 | FE(L) | 0 | FE(L) | 0 |
|  |  |  | FE(S) | 18 | FE(S) | 22 |
| Control 1 | 4.5 | 0.1 | FE(L) | 3 | FE(L) | 7 |
|  |  |  | FE(S) | 400 | FE(S) | more than 500 |
| Control 2 | 4.4 | 1.8 | FE(L) | 1 | FE(L) | 3 |
|  |  |  | FE(S) | 70 | FE(S) | 150 |
| Control 3 | 4.5 | 0.7 | FE(L) | 2 | FE(L) | 5 |
|  |  |  | FE(S) | 100 | FE(S) | 220 |
| Control 4 | 4.4 | 0.6 | FE(L) | 2 | FE(L) | 4 |
|  |  |  | FE(S) | 140 | FE(S) | 370 |
| Control 5 | 4.5 | 0.8 | FE(L) | 2 | FE(L) | 4 |
|  |  |  | FE(S) | 100 | FE(S) | 210 |

(Note 1)
Appearance of film was estimated by the number of fish eyes observed on a film of 20 × 15 cm.

FE(L) shows the number of fish eyes having a diameter of not less than 0.3 mm.

FE(S) shows the number of fish eyes having a diameter of less than 0.3 mm.
(Note 2)

One cycle: 25 sec.

The article so obtained and sprue attached thereto were pulverized and the same injection molding as above was carried out again by employing the obtained powder. This procedure was repeated.

In each injection molding test, coloration was observed and spiral flow length correlative with melt viscosity was measured.

The results are shown in Table 3.

Table 3

|  | Virgin | | Repetition number: 1 | | Repetition number: 3 | | Repetition number: 5 | |
|---|---|---|---|---|---|---|---|---|
|  | S* cm. | Coloration — | S* cm. | Coloration — | S* cm. | Coloration — | S* cm. | Coloration — |
| Example 1 | 36 | 0 | 36 | 0 | 34 | 1 | 32 | 1 |
| Example 2 | 37 | 0 | 36 | 0 | 33 | 1 | 30 | 1 |
| Control 1 | 39 | 2 | 15 | 3 | 9 | 4 | 7 | 4 |
| Control 2 | 37 | 1 | 26 | 2 | 17 | 3 | 15 | 3 |
| Control 3 | 39 | 1 | 24 | 2 | 14 | 3 | 12 | 3 |
| Control 4 | 36 | 2 | 20 | 3 | 11 | 4 | 10 | 4 |

Table 3-continued

|  | Virgin | | Repetition number: 1 | | Repetition number: 3 | | Repetition number: 5 | |
| --- | --- | --- | --- | --- | --- | --- | --- | --- |
|  | S* | Coloration | S* | Coloration | S* | Coloration | S* | Coloration |
|  | cm. | — | cm. | — | cm. | — | cm. | — |
| Control 5 | 36 | 1 | 25 | 2 | 16 | 3 | 14 | 3 |

*S shows the spiral flow length.

(Note) Coloration was represented as follows:
0: No coloration
1: Faint yellow
2: Light yellow
3: Yellow
4: Yellowish brown As is clear from Table 3, in the present invention, viscosity increase is very small even though remolding is repeated, and molding procedure is very easy. Since coloration of the molded article is slight and further the reuse ability is very execellent, sprue and runner produced in large quantities upon injection molding are of some service. These advantages are useful in industry.

EXAMPLES 3 to 5 AND CONTROLS 6 TO 9

The drying under reduced pressure was carried out according to the procedure of Example 1 except that a 200 liter vacuum drying apparatus as shown in FIG. 1, in which the blade of the agitator was in a form of fan, heating medium flows through the blade, was employed. The blade per se was heating surface.

As Controls, drying at atmospheric pressure (Control 6) and drying under reduced pressure outside the specific ranges of the invention (Controls 7 to 9) were also carried out.

The drying conditions are shown in Table 4.

Table 4

|  | Pressure in dryer [P] | Temperature of heating surface of dryer [T] (temperature of heating medium) | Residence time [θ] (drying time) | $T \times \theta^{0.6}$ | Content of volatile material after drying |
| --- | --- | --- | --- | --- | --- |
|  | mmHg | °C. | hour | — | % |
| Example 3 | 115 | 98 | 2.2 | 157 | 2.0 |
| Example 4 | 60 | 80 | 2.1 | 125 | 2.0 |
| Example 5 | 80 | 80 | 8.5 | 289 | 2.0 |
| Control 6 | 760 | 101 | 7.8 | — | 2.0 |
| Control 7 | 119 | 97 | 10.7 | 402 | 1.9 |
| Control 8 | 100 | 115 | 3.3 | 241 | 2.0 |
| Control 9 | 320 | 98 | 6.8 | 310 | 2.1 |

The dry powder so obtained was supplied to an extruder of vent type and was melt-extruded in a line. The extrudate was cut into pieces to prepare pellets. The water content of the pellet was 0.2 to 0.4 %. Employing the pellet so obtained, extruding and injection moldings were carried out in the same manner as in Example 1.

The results are shown in Tables 5 and 6.

Table 5

|  | Melt flow index (g./10 minutes) | | Appearance of film | | | |
| --- | --- | --- | --- | --- | --- | --- |
|  | supplied resin | after 24 hours | Immediately after operation | | after 24 hours | |
| Example 3 | 4.3 | 3.5 | FE(L) | 0 | FE(L) | 0 |
|  |  |  | FE(S) | 16 | FE(S) | 20 |
| Example 4 | 4.3 | 3.6 | FE(L) | 0 | FE(L) | 0 |
|  |  |  | FE(S) | 10 | FE(S) | 14 |
| Example 5 | 4.3 | 3.5 | FE(L) | 0 | FE(L) | 0 |
|  |  |  | FE(S) | 15 | FE(S) | 18 |
| Control 6 | 4.5 | 0.2 | FE(L) | 3 | FE(L) | 6 |
|  |  |  | FE(S) | 280 | FE(S) | 450 |
| Control 7 | 4.4 | 2.0 | FE(L) | 1 | FE(L) | 2 |
|  |  |  | FE(S) | 80 | FE(S) | 150 |
| Control 8 | 4.5 | 0.5 | FE(L) | 2 | FE(L) | 4 |
|  |  |  | FE(S) | 160 | FE(S) | 360 |
| Control 9 | 4.5 | 0.6 | FE(L) | 2 | FE(L) | 4 |
|  |  |  | FE(S) | 130 | FE(S) | 250 |

Table 6

|  | Virgin | | Repetition number: 1 | | Repetition number: 3 | | Repetition number: 5 | |
| --- | --- | --- | --- | --- | --- | --- | --- | --- |
|  | S* | Coloration | S* | Coloration | S* | Coloration | S* | Coloration |
|  | cm. | — | cm. | — | cm. | — | cm. | — |
| Example 3 | 40 | 0 | 39 | 0 | 37 | 0 | 34 | 1 |
| Example 4 | 38 | 0 | 38 | 0 | 37 | 1 | 34 | 1 |
| Example 5 | 39 | 0 | 38 | 0 | 34 | 1 | 31 | 1 |
| Control 6 | 40 | 2 | 16 | 3 | 10 | 4 | 8 | 4 |
| Control 7 | 39 | 1 | 25 | 2 | 20 | 2 | 18 | 3 |
| Control 8 | 39 | 1 | 19 | 2 | 11 | 3 | 10 | 4 |
| Control 9 | 41 | 1 | 21 | 2 | 14 | 3 | 12 | 4 |

*S shows the spiral flow length.

Also, employing a horizontal, cylindrical vacuum drying apparatus of rotation type as shown in FIG. 2 and a vertical, cylindrical vacuum drying apparatus as shown in FIG. 3, the drying operations according to the procedure of Example 3 were carried out. Good results similar to those obtained in Example 3 were obtained.

EXAMPLE 6 TO 8 AND CONTROL 10

Employing the drying apparatus employed in Example 3, wet particles of hydrolyzed ethylene-vinyl acetate copolymer (ethylene content: 39.0 % by mole, degree of hydrolysis in vinyl acetate component: 99.0 % by mole) containing 47 % of water were dried under reduced pressure under the conditions shown in Table 7.

As a Control, drying at atmospheric pressure (Control 10) was also carried out.

Table 7

|  | Pressure in dryer [P] mmHg | Temperature of heating surface of dryer [T] (temperature of heating medium) °C. | Residence time [θ] (drying time) hour | $T \times \theta^{0.6}$ | Content of volatile material after drying % |
|---|---|---|---|---|---|
| Example 6 | 110 | 96 | 2.5 | 166 | 2.0 |
| Example 7 | 60 | 80 | 2.3 | 132 | 1.9 |
| Example 8 | 80 | 85 | 8.3 | 302 | 1.9 |
| Control 10 | 760 | 101 | 8.0 | — | 2.0 |

The powder so obtained was pelletized. The water content of the pellet was 0.2 to 0.4 %. The extruding machine was continuously operated for 24 hours under the same conditions as in Example 1 to give a film having a thickness of 20 μ.

The results are shown in Table 8.

Table 8

|  | Melt flow index (g./10 minutes) | | Appearance of film | | | |
|---|---|---|---|---|---|---|
|  | supplied resin | after 24 hours | immediately after operation | | after 24 hours | |
| Example 6 | 6.5 | 5.7 | FE(L) | 0 | FE(L) | 0 |
|  |  |  | FE(S) | 18 | FE(S) | 20 |
| Example 7 | 6.5 | 5.9 | FE(L) | 0 | FE(L) | 0 |
|  |  |  | FE(S) | 10 | FE(S) | 13 |
| Example 8 | 6.5 | 5.8 | FE(L) | 0 | FE(L) | 0 |
|  |  |  | FE(S) | 14 | FE(S) | 19 |
| Control 10 | 6.3 | 1.1 | FE(L) | 2 | FE(L) | 4 |
|  |  |  | FE(S) | 220 | FE(S) | 300 |

The pellet was supplied to an in-line screw type injection molding machine of 3.5 oz.advp. and injection molding was carried out under the following conditions to give a spiral article.

INJECTION MOLDING CONDITION:

Cylinder temperature at front part: 270° C.
Cylinder temperature at rear part: 250° C.
Nozzle temperature: 260° C.
Mold temperature: 90° C.
Injection pressure: 1,000 kg./ cm.²
One cycle: 30 sec.

The molded article and sprue attached thereto were pulverized and the same injection molding as above was carried out again by employing the obtained powder. This procedure was repeated.

The results are shown in Table 9.

Table 9

|  | Virgin | | Repetition number: 1 | | Repetition number: 3 | | Repetition number: 5 | |
|---|---|---|---|---|---|---|---|---|
|  | S* cm. | Coloration — | S* cm. | Coloration — | S* cm. | Coloration — | S* cm. | Coloration — |
| Example 6 | 52 | 0 | 50 | 0 | 47 | 1 | 44 | 1 |
| Example 7 | 54 | 0 | 52 | 0 | 49 | 1 | 48 | 1 |
| Example 8 | 52 | 0 | 50 | 0 | 49 | 0 | 45 | 1 |
| Control 10 | 49 | 1 | 31 | 3 | 22 | 3 | 18 | 4 |

*S shows the spiral flow length.

What we claim is:

1. In a process for drying wet particles of hydrolyzed ethylene-vinyl acetate copolymer having an ethylene content of 20 to 50% by mole, a vinyl acetate content of 80 to 50% by mole and a degree of hydrolysis in vinyl acetate component of at least 90% by mole obtained by hydrolyzing ethylene-vinyl acetate copolymer in a medium, the improvement which comprises carrying out the drying under a pressure in a dryer of up to 120 mmHg, a temperature of the heating surface of the dryer of up to 100° C., and such that $T \times \theta^{0.6} \leq 320$ wherein T is a temperature (°C.) of the heating surface and θ is a residence time of the particles in the dryer.

* * * * *